(12) United States Patent
Huang et al.

(10) Patent No.: US 11,490,238 B2
(45) Date of Patent: Nov. 1, 2022

(54) METHOD FOR JOINING A ZIGBEE DEVICE TO A ZIGBEE NETWORK AND CORRESPONDING ZIGBEE DEVICE

(71) Applicant: LEDVANCE GmbH, Garching bei Munich (DE)

(72) Inventors: Huajin Huang, Shenzhen (CN); Wang Jiang, Shenzhen (CN); Wuqiang Liao, Shenzhen (CN); Li Lu, Shenzhen (CN)

(73) Assignee: LEDVANCE GMBH, Garching bei Munchen (DE)

( * ) Notice: Subject to any disclaimer, the term of this patent is extended or adjusted under 35 U.S.C. 154(b) by 98 days.

(21) Appl. No.: 16/778,226

(22) Filed: Jan. 31, 2020

(65) Prior Publication Data
US 2020/0252776 A1    Aug. 6, 2020

(30) Foreign Application Priority Data
Jan. 31, 2019   (CN) .......................... 201910097960.7

(51) Int. Cl.
| H04W 4/80 | (2018.01) |
| H04W 80/06 | (2009.01) |
| H04W 4/70 | (2018.01) |
| H04W 12/033 | (2021.01) |

(52) U.S. Cl.
CPC ............... *H04W 4/80* (2018.02); *H04W 4/70* (2018.02); *H04W 12/033* (2021.01); *H04W 80/06* (2013.01)

(58) Field of Classification Search
CPC .......... H04W 4/80; H04W 4/70; H04W 80/06
See application file for complete search history.

(56) References Cited

U.S. PATENT DOCUMENTS

| 2016/0309330 A1* | 10/2016 | Moon .................... H04W 12/06 |
| 2019/0210849 A1* | 7/2019 | High ..................... B62B 5/0076 |
| 2019/0223014 A1* | 7/2019 | Deshpande ............. H04W 4/80 |

FOREIGN PATENT DOCUMENTS

| CN | 101772023 A | * 7/2010 | |
| CN | 105162728 A | * 12/2015 | ............. H04L 47/70 |

* cited by examiner

*Primary Examiner* — Samina F Choudhry
(74) *Attorney, Agent, or Firm* — Hayes Soloway PC

(57) ABSTRACT

A method for joining a Zigbee device to a Zigbee network, includes starting a Zigbee protocol stack and a Bluetooth protocol stack on the Zigbee device, sending out Zigbee requests to seek for Zigbee networks, sending out Bluetooth beacon messages containing a Zigbee install code, wherein the Zigbee requests and the Bluetooth beacon messages are sent out in a time division multiplex manner.

20 Claims, 2 Drawing Sheets

METHOD FOR JOINING A ZIGBEE DEVICE TO A ZIGBEE NETWORK AND CORRESPONDING ZIGBEE DEVICE

CROSS-REFERENCE TO RELATED APPLICATIONS AND PRIORITY

This patent application claims priority from CN Patent Application No. 201910097960.7 filed Jan. 31, 2019, which is herein incorporated by reference in its entirety.

TECHNICAL FIELD

The present invention relates to methods for joining a device, in particular a lighting device to a Zigbee network and to corresponding devices.

BACKGROUND

Zigbee is a low-power, low data rate, and close proximity wireless network. Every Zigbee network has a coordinator device acting as a trust center to coordinate, which devices are allowed to join the network.

In Zigbee 3.0 systems, all Zigbee devices capable of joining networks must support the use of install codes. The install code itself is a random value installed on the joining device at manufacturing time, and is used to encrypt the initial message exchange between the device and the trust center (the coordinator).

The install code is typically printed on the case or on the device, either as a hexadecimal string or as a graphical encoding such as a barcode or a QR code, and can be provided to the trust center via an out-of-band mechanism. For example, the install code can be entered into an application running on a smartphone (e.g., by typing or by scanning the graphical encoding) and be sent from the application to the trust center, together the 64-bit IEEE MAC address ("EUI64") of the device. Once these security credentials are known to the trust center, the in-band joining process may be initiated.

This process may be cumbersome to the user, because the user must identify and enter the code correctly. There is, furthermore, a security risk as a hacker could have a chance to get the install code on the packaging or on the device.

It has been proposed to implement Zigbee as well as Bluetooth technology in the Zigbee devices as well as in the Zigbee trust center, such that the install code can be transferred from the device to the smartphone app and from the smartphone app to the trust center via Bluetooth before switching the device to the Zigbee mode ("UG267: Switched Multiprotocol User's Guide" by Silicon Laboratories Inc.).

Such a process may still require a significant amount of time, especially when a large number of device is to be installed.

SUMMARY OF THE INVENTION

In view of the known prior art, it is an object of the present invention to provide an improved method for joining a device to a Zigbee network overcoming the disadvantages presented above.

This object is solved by a method and a device according to the independent claims. Preferred embodiments are given by the dependent claims.

In a method according to the present invention for joining a Zigbee device to a Zigbee network, a Zigbee protocol stack and a Bluetooth protocol stack are started on the Zigbee device. Both protocol stacks may be started on the same processing means. Both protocol stacks may be started every time at power-up as long as the Zigbee device is not joined to a Zigbee network, so in particular upon the first power-up of the Zigbee device after manufacturing and after resetting the Zigbee device to factory-new conditions. Both protocol stacks (or at least the protocol stack not running anymore (Bluetooth protocol stack)) may also be started once the Zigbee device leaves a Zigbee network that is has joined before. The Zigbee device may in particular support at least the Zigbee 3.0 standard.

The Zigbee device, and more specifically the processing means in connection with transmitting means such as a transmitter and an antenna, sends out (broadcasts) Zigbee requests to seek for Zigbee networks, in particular for a Zigbee coordinator device or trust center. The Zigbee device furthermore sends out (broadcasts) Bluetooth beacon messages containing a Zigbee install code of the Zigbee device. The Bluetooth beacon messages may also include the 64-bit IEEE MAC address ("EUI64") of the Zigbee device. The term "Zigbee device" herein means a device that is primarily intended for joining a Zigbee network, but that may also be able to use other communications protocols such as Bluetooth.

The install code as well as the EUI64 may have been programmed into a memory area of the processing means or into a separate memory of the Zigbee device. The processing means may then read the install code and the EUI64 upon starting the Zigbee protocol stack.

The Zigbee requests and the Bluetooth beacon messages are sent out by the Zigbee device in a time division multiplex manner. In other words, a Bluetooth beacon message may be sent out after every one or more Zigbee requests. In this way, communication of the Zigbee device with a trust center of the Zigbee network as well as with a Bluetooth communication device for transmitting the install code to the trust center can happen quasi-simultaneously.

This significantly decreases the amount of time required for joining the Zigbee device to the Zigbee network.

Once the Zigbee device has successfully joined the Zigbee network, the Bluetooth protocol stack may be terminated (shut down).

The Bluetooth protocol stack may in particular be a Bluetooth Low Energy (BLE) protocol stack.

In an embodiment, the Bluetooth beacon message sent out by the Zigbee device is received by a Bluetooth communication device. A Bluetooth communication device herein is a device that may communicate using Bluetooth, but that may also be able to use other communication protocols. For example, a smartphone or a tablet computer running a suitable application may be used as a Bluetooth communication device.

The Bluetooth communication device then obtains the Zigbee install code from the Bluetooth beacon message that it has received. The obtained Zigbee install code is then sent to a trust center device of the Zigbee network. This Zigbee install code enables the Zigbee device to join the Zigbee network in a known manner.

In an embodiment, sending the Zigbee install code to a trust center device of the Zigbee network comprises sending the Zigbee install code from the Bluetooth communication device to a server and sending the Zigbee install code from the server to the trust center device of the Zigbee network. In other words, the Bluetooth communication device does not communicate directly with the trust center, but indirectly via the server. The server may be a computing device within the local network. The server may also be a computing device to which the Bluetooth communication device connects via the internet (also known as a "cloud server").

The step of sending the Zigbee install code from the Bluetooth communication device to a server and/or the step of sending the Zigbee install code from the server to the trust center device of the Zigbee network may be carried out over TCP/IP. Alternatively, other suitable communication protocols may be used.

In another embodiment, the Bluetooth communication device may communicate with the Zigbee trust center directly, for example via Bluetooth or via TCP/IP.

In an embodiment, sending out Bluetooth beacon messages containing a Zigbee install code is ceased once the Zigbee device has been joined to the Zigbee network. At this point in time, the Zigbee install code has already been successfully transmitted to the trust center and its broadcasting is no longer needed. The Bluetooth protocol stack may also be completely shut down at this time.

The Bluetooth beacon messages may be sent out encrypted. The Bluetooth beacon messages may then be decrypted by the Bluetooth communication device. This may prevent a hacker from intercepting the Zigbee install code.

The present invention further relates to a Zigbee device capable of joining a Zigbee network and adapted to be used in the methods described herein. The Zigbee device comprises at least one processing means, which is configured to start a Zigbee protocol stack and a Bluetooth protocol stack on the Zigbee device, send out (broadcast) Zigbee requests to seek for Zigbee networks, and send out Bluetooth beacon messages containing a Zigbee install code of the Zigbee device.

The processing means may configured to start both protocol stacks every time at power-up of the Zigbee device as long as the Zigbee device is not joined to a Zigbee network, so in particular upon the first power-up of the Zigbee device after manufacturing and after resetting the Zigbee device to factory-new conditions. The processing means may also be configured to start both protocol stacks (or at least the protocol stack not running anymore (Bluetooth protocol stack)) once the Zigbee device leaves a Zigbee network that is has joined before. The Zigbee device may in particular support at least the Zigbee 3.0 standard.

The Zigbee device may further comprise a memory (e.g., a memory area of the processing means or a separate memory) for storing the install code as well as the EUI64. The processing means may be configured to read the install code and the EUI64 upon starting the Zigbee protocol stack.

The processing means of the Zigbee device is further configured to send out the Zigbee requests and the Bluetooth beacon messages in a time division multiplex manner as described above.

In an embodiment, the processing means are further configured to cease sending out Bluetooth beacon messages containing a Zigbee install code once the Zigbee device has been joined to the Zigbee network. At this point in time, the Zigbee install code has already been successfully transmitted to the trust center and its broadcasting is no longer needed. The Bluetooth protocol stack may also be completely shut down at this time.

In an embodiment, the processing means are further configured to send out the Bluetooth beacon messages encrypted. This may prevent a hacker from intercepting the Zigbee install code.

In an embodiment, the at least one processing means comprises a single processing means (processor) capable of running the Zigbee protocol stack and the Bluetooth protocol stack. Such a processor may be an EFR32MG12 SoC (System-on-Chip) available from Silicon Laboratories Inc.

The features described above with reference to the method may also be applied to the device and vice versa.

BRIEF DESCRIPTION OF THE DRAWINGS

Preferred embodiments of the invention will be explained in the following, having regard to the drawings. It is shown in.

DETAILED DESCRIPTION OF THE INVENTION

In the following, preferred embodiments of the invention will be described with reference to the drawings. The same or similar elements or elements having the same effect may be indicated by the same reference number in multiple drawings. Repeating the description of such elements may be omitted in order to prevent redundant descriptions.

Figure 1:
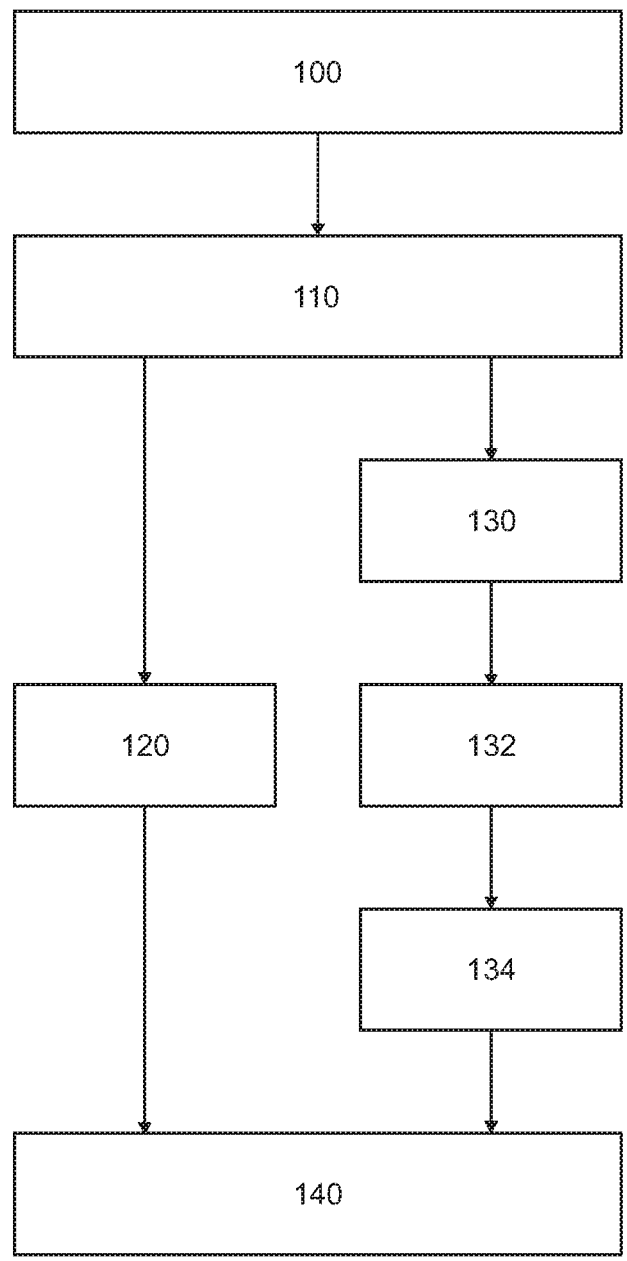
FIG. 1 a flow diagram of an embodiment of a method according to the invention.

In FIG. 1, an embodiment of a method according to the present invention is shown as a flow diagram. In step 100, a Zigbee device 10, for example a lighting device such as a lamp (often called "smart lamp"), is powered up for the first time after manufacturing (or after it has been reset to factory settings). The Zigbee device 10 is not yet joined to a Zigbee network. Thus, the processing means 12 of the Zigbee device 10 boots a Zigbee protocol stack and a Bluetooth protocol stack on the Zigbee device. Both protocol stacks run quasi-simultaneously on the processing means 12 in a multitasking manner.

In step 110, the processing means 12 reads the Zigbee install code and the EUI64 of the Zigbee device 10 from a memory 14 of the Zigbee device 10. The Zigbee install code and the EUI64 are encrypted by the processing means 12.

In step 120, the Zigbee device 10 broadcasts Zigbee requests to seek for Zigbee networks. This may happen in the form of beacon requests, i.e. periodic Zigbee messages intended to trigger a response from a coordinator device 40 (trust center) of an available Zigbee network. These Zigbee beacon requests also allow the coordinator device 40 to determine that a new Zigbee device 10 intends to join the Zigbee network.

In parallel to the Zigbee beacon requests in step 120, the encrypted Zigbee install code and the EUI64 are sent out via Bluetooth beacon messages in step 130. Zigbee beacon requests in step 120 and Bluetooth beacon messages in step 130 are sent out in a time division multiplex manner. In particular, a Bluetooth beacon message including the Zigbee install code and the EUI64 may be sent out after every or after every few Zigbee beacon requests.

In step 132, the Bluetooth beacon messages are received by a Bluetooth communication device 20, such as a smartphone or tablet computer running an application looking for the Bluetooth beacon messages. The encrypted Zigbee install code and the EUI64 may be decrypted by the application running on the Bluetooth communication device 20.

In step 134, the Zigbee install code and the EUI64 are sent to the coordinator device 40, allowing the coordinator device 40 to start the joining process.

In step 140, the coordinator device 40 may communicate with the Zigbee device 10 in order to join the Zigbee device 10 to the Zigbee network. As the Bluetooth beacon messages with the Zigbee install code and the EUI64 are no longer required, the Zigbee device 10 ceases broadcasting these messages.

Figure 2:
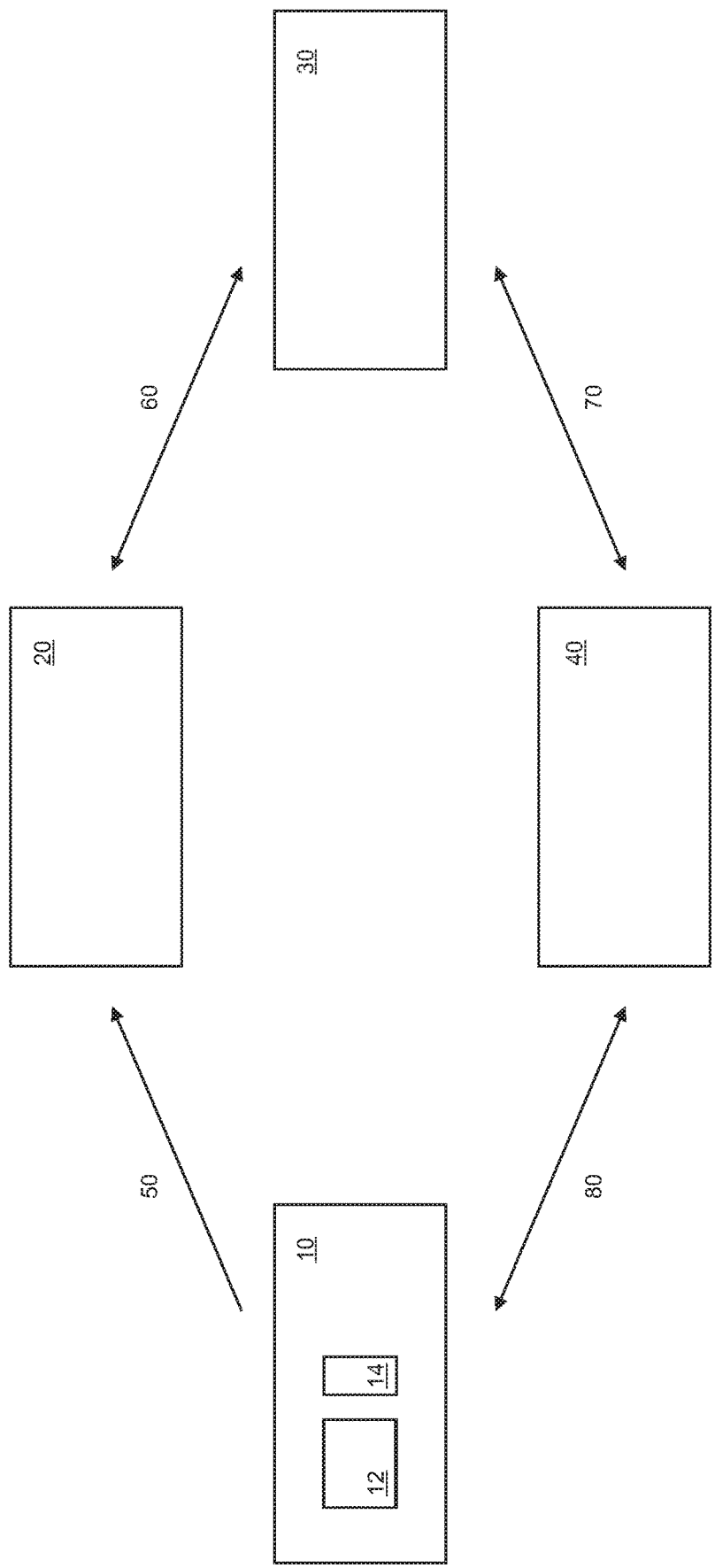
FIG. 2 schematically a system for carrying out a method according to the invention.

FIG. 2 schematically shows a system for carrying out a method according to the invention. The system comprises a Zigbee device 10 having a processing means 12 and a memory 14 for storing the Zigbee install code and the EUI64 of the Zigbee device 10.

The system further comprises a Bluetooth communication device 20 such as a smartphone or a tablet computer. The Bluetooth communication device 20 is able to run an application for receiving Bluetooth beacon messages and for communicating either with a Zigbee coordinator device 40 or with a server 30.

The system also comprises a Zigbee coordinator device 40 (trust center, also called Zigbee gateway).

As Zigbee and Bluetooth are short range communication protocols, the Zigbee device 10, the Bluetooth communication device 20, and the Zigbee coordinator device 40 are usually located in close proximity to each other, in particular on the same premises.

The system furthermore comprises a server 30, which may be a computing device to which the Bluetooth communication device connects via the internet (also known as a "cloud server"). The server 30, therefore, needs not to be on the same premises as the Zigbee device 10, the Bluetooth communication device 20, and the Zigbee coordinator device 40.

During the method according to the present invention, the Zigbee device 10 may be configured to broadcast 50 Bluetooth beacon messages containing the Zigbee install code and the EUI64 of the Zigbee device 10. It is not necessary that the Zigbee device 10 is configured to receive any Bluetooth messages.

The Bluetooth communication device may transmit 60 the Zigbee install code and the EUI64 of the Zigbee device 10 received via the Bluetooth beacon messages to the server 30 via TCP/IP. The Bluetooth communication device 20 may be connected to the server 30 in a wireless manner, in a wired manned, or in a combination thereof.

The Zigbee coordinator device 40 may also be connected to the server 30 in a wireless manner, in a wired manned, or in a combination thereof. The Zigbee coordinator device 40 may communicate 70 with the server via TCP/IP and may receive from the server 30 the Zigbee install code and the EUI64 of the Zigbee device 10.

Once the Zigbee coordinator device 40 has received the Zigbee install code and the EUI64 of the Zigbee device 10, it may communicate 80 with the Zigbee device 10 in order to join the Zigbee device 10 to the Zigbee network under the control of the coordinator device 40.

Although the invention has been illustrated and described in detail by the embodiments explained above, it is not limited to these embodiments. Other variations may be derived by the skilled person without leaving the scope of the attached claims.

Generally, "a" or "an" may be understood as singular or plural, in particular with the meaning "at least one", "one or more", etc., unless this is explicitly excluded, for example by the term "exactly one", etc.

In addition, numerical values may include the exact value as well as a usual tolerance interval, unless this is explicitly excluded.

Features shown in the embodiments, in particular in different embodiments, may be combined or substituted without leaving the scope of the invention.

LIST OF REFERENCE NUMERALS

10 Zigbee device
12 Processing means
14 Memory
20 Bluetooth communication device
30 Server
40 Zigbee coordinator device (trust center)
50 Broadcasting of Zigbee install code and EUI64
60 Communication between Bluetooth communication device and server
70 Communication between Zigbee coordinator device and server
80 Communication between Zigbee coordinator device and Zigbee device
100-140 Method steps

The invention claimed is:

1. A method for joining a Zigbee device to a Zigbee network, the method comprising:
   starting a Zigbee protocol stack and a Bluetooth protocol stack on the Zigbee device;
   sending out, to a first wireless communication device, Zigbee requests to seek a Zigbee network; and
   sending out, to a second wireless communication device, Bluetooth beacon messages containing a Zigbee install code;
   wherein the Zigbee requests and the Bluetooth beacon messages are sent out in a time division multiplex manner; and
   wherein the first wireless communication device and the second wireless communication device are different devices.

2. A method for joining a Zigbee device to a Zigbee network, the method comprising:
   starting a Zigbee protocol stack and a Bluetooth protocol stack on the Zigbee device;
   sending out Zigbee requests to seek a Zigbee network and sending out Bluetooth beacon messages containing a Zigbee install code, wherein the Zigbee requests and the Bluetooth beacon messages are sent out in a time division multiplex manner;
   receiving a Bluetooth beacon message sent out by the Zigbee device with a Bluetooth communication device;
   obtaining the Zigbee install code from the Bluetooth beacon message;
   sending the Zigbee install code to a trust center device of the Zigbee network; and
   joining the Zigbee device to the Zigbee network using the Zigbee install code.

3. The method according to claim 2, wherein sending the Zigbee install code to the trust center device of the Zigbee network comprises:
   sending the Zigbee install code from the Bluetooth communication device to a server; and
   sending the Zigbee install code from the server to the trust center device of the Zigbee network.

4. The method according to claim 3, wherein at least one of sending the Zigbee install code from the Bluetooth communication device to the server and sending the Zigbee install code from the server to the trust center device of the Zigbee network is carried out over TCP/IP.

5. The method according to claim 2, further comprising:
   ceasing to send out Bluetooth beacon messages containing the Zigbee install code once the Zigbee device has been joined to the Zigbee network.

6. The method according to claim 2, wherein the Bluetooth beacon messages are sent out encrypted.

7. A Zigbee device configured to join a Zigbee network according to the method of claim 2, the Zigbee device comprising:
  at least one processing means configured to:
    start the Zigbee protocol stack and the Bluetooth protocol stack on the Zigbee device;
    send out the Zigbee requests to seek for Zigbee networks; and
    send out the Bluetooth beacon messages containing the Zigbee install code;
  wherein the Zigbee device is configured to send out the Zigbee requests and the Bluetooth beacon messages in the time division multiplex manner.

8. The Zigbee device according to claim 7, wherein the at least one processing means is further configured to at least one of:
  cease sending out Bluetooth beacon messages containing the Zigbee install code once the Zigbee device has been joined to the Zigbee network; and
  send out the Bluetooth beacon messages encrypted.

9. The Zigbee device according to claim 7, further comprising:
  memory communicatively coupled with the at least one processing means;
  a transmitter communicatively coupled with the at least one processing means; and
  an antenna communicatively coupled with the transmitter.

10. The Zigbee device according to claim 7, wherein the Zigbee device is a lighting device or a lamp.

11. The method according to claim 2, wherein at least one of:
  the Zigbee requests are Zigbee beacon requests; and
  the Bluetooth beacon messages further contain a MAC address.

12. The method according to claim 2, wherein the Zigbee device is a lighting device or a lamp.

13. The method according to claim 1, wherein the Bluetooth beacon messages are sent out encrypted.

14. The method according to claim 1, wherein at least one of:
  the Zigbee requests are Zigbee beacon requests; and
  the Bluetooth beacon messages further contain a MAC address.

15. A Zigbee device configured to join a Zigbee network according to the method of claim 1, the Zigbee device comprising:
  at least one processing means configured to:
    start the Zigbee protocol stack and the Bluetooth protocol stack on the Zigbee device;
    send out the Zigbee requests to seek for Zigbee networks; and
    send out the Bluetooth beacon messages containing the Zigbee install code;
  wherein the Zigbee device is configured to send out the Zigbee requests and the Bluetooth beacon messages in the time division multiplex manner.

16. The Zigbee device according to claim 15, wherein the at least one processing means is further configured to at least one of:
  cease sending out Bluetooth beacon messages containing the Zigbee install code once the Zigbee device has been joined to the Zigbee network; and
  send out the Bluetooth beacon messages encrypted.

17. The Zigbee device according to claim 15, further comprising:
  memory communicatively coupled with the at least one processing means;
  a transmitter communicatively coupled with the at least one processing means; and
  an antenna communicatively coupled with the transmitter.

18. The Zigbee device according to claim 15, wherein the Zigbee device is a lighting device or a lamp.

19. The Zigbee device according to claim 15, wherein the Zigbee device is configured to transmit but not receive a Bluetooth signal.

20. The Zigbee device according to claim 7, wherein the Zigbee device is configured to transmit but not receive a Bluetooth signal.

* * * * *